US012228505B2

(12) United States Patent
Puppe et al.

(10) Patent No.: US 12,228,505 B2
(45) Date of Patent: Feb. 18, 2025

(54) OPTICAL SCANNING

(71) Applicant: TOPTICA Photonics AG, Gräfelfing (DE)

(72) Inventors: Thomas A. Puppe, Munich (DE); Nico Vieweg, Stockdorf (DE); Christian Rausch, Unterhaching (DE)

(73) Assignee: TOPTICA Photonics AG, Gräfelfing (DE)

( * ) Notice: Subject to any disclaimer, the term of this patent is extended or adjusted under 35 U.S.C. 154(b) by 0 days.

(21) Appl. No.: 17/342,632

(22) Filed: Jun. 9, 2021

(65) Prior Publication Data
US 2021/0381964 A1   Dec. 9, 2021

(30) Foreign Application Priority Data

Jun. 9, 2020  (DE) .................. 10 2020 115 338.4

(51) Int. Cl.
  *G01N 21/3581*   (2014.01)
(52) U.S. Cl.
  CPC ... *G01N 21/3581* (2013.01); *G01N 2201/061* (2013.01)
(58) Field of Classification Search
  CPC .......... G01N 21/3581; G01N 2201/061; H01S 3/067; H01S 3/1106; H01S 3/1305; H01S 3/2383; H01S 3/1307
  See application file for complete search history.

(56) References Cited

U.S. PATENT DOCUMENTS 4,685,111 A * 8/1987 Baer .................... H01S 3/1394
                                                       372/18
5,367,529 A * 11/1994 Holsinger ............. H01S 3/2383
                                                       372/38.1
(Continued)

OTHER PUBLICATIONS

Yahyapour et al.,Fastest Thickness Measurements with a Terahertz Time-Domain System Based on Electronically Controlled Optical Sampling. Applied Sciences. 2019; 9(7):1283 (Year: 2019).*
(Continued)

*Primary Examiner* — David P Porta
*Assistant Examiner* — Djura Malevic

(57) ABSTRACT

The invention relates to a device for generating temporally spaced light pulses. Said device comprises a first light source which emits a first train of light pulses, a second light source which emits a second train of light pulses, and a phase-locked loop which regulates the relative phase of the light-pulse trains towards a target value. When the two light-pulse trains each pass through an optical transmission path to an application site that is spatially remote from the light sources, fluctuating phase differences in the light-pulse trains at the application site occur due to external influences along the transmission paths. The object of the invention is to provide an improved device for generating temporally spaced light pulses. In particular, the above-mentioned fluctuating phase differences are intended to be prevented. To do this, the invention proposes a detection apparatus that interacts with the phase-locked loop and detects a phase difference in the light-pulse trains at the application site caused by propagation-time differences along the transmission paths. In particular, the phase difference in the light-pulse trains at the application site is derived from light pulses that are reflected from the application site and pass through the transmission paths in the return direction. The detected phase difference can then be compensated for by the existing (Continued)

regulation of the relative phase of the light-pulse trains. In addition, the invention relates to a method for generating temporally spaced light pulses.

14 Claims, 2 Drawing Sheets

(56) References Cited

U.S. PATENT DOCUMENTS

| | | | | |
|---|---|---|---|---|
| 5,708,670 | A * | 1/1998 | Pfeiffer | H01S 3/06791 372/18 |
| 6,088,491 | A * | 7/2000 | Sorin | G02F 1/093 359/489.08 |
| 6,301,045 | B1 * | 10/2001 | Liu | G02B 27/283 385/11 |
| 6,396,856 | B1 * | 5/2002 | Sucha | H01S 3/2383 372/30 |
| 6,687,270 | B1 * | 2/2004 | Robertson, III | H01S 3/139 372/18 |
| 6,785,303 | B1 * | 8/2004 | Holzwarth | H01S 3/1112 372/100 |
| 6,831,935 | B2 * | 12/2004 | Ye | H05G 2/00 372/18 |
| 7,038,781 | B2 * | 5/2006 | Pang | G01J 11/00 356/450 |
| 7,327,471 | B2 * | 2/2008 | Tiemann | H01S 3/13 356/519 |
| 7,333,733 | B2 * | 2/2008 | Taylor | H01L 29/66462 257/E21.387 |
| 7,483,641 | B1 * | 1/2009 | Mak | H04B 10/676 398/202 |
| 7,580,432 | B2 * | 8/2009 | Sucha | G01P 3/806 372/6 |
| 7,957,435 | B2 * | 6/2011 | Rausch | G01J 3/2889 372/30 |
| 8,023,540 | B2 * | 9/2011 | Kupershmidt | H01S 5/40 372/32 |
| 8,077,385 | B2 * | 12/2011 | Yang | H04B 10/2971 359/484.05 |
| 8,515,290 | B2 * | 8/2013 | Bartels | H01S 3/1307 359/332 |
| 9,306,363 | B1 * | 4/2016 | Braga | H01S 3/1109 |
| 9,537,571 | B2 * | 1/2017 | Li | H04L 7/0091 |
| 9,685,754 | B2 * | 6/2017 | Puppe | G01J 3/10 |
| 9,711,935 | B2 * | 7/2017 | Rausch | H01S 3/1305 |
| 10,044,165 | B1 * | 8/2018 | Cullen | H01S 3/1121 |
| 2002/0110305 | A1 * | 8/2002 | Huang | G02B 6/2746 385/11 |
| 2004/0081467 | A1 * | 4/2004 | Taylor | H01L 29/66318 257/E21.387 |
| 2006/0192970 | A1 * | 8/2006 | Tiemann | H01S 3/13 356/454 |
| 2010/0002737 | A1 * | 1/2010 | Rausch | G01J 3/10 356/451 |
| 2011/0085573 | A1 * | 4/2011 | Bartels | H01S 3/1307 372/25 |
| 2011/0216791 | A1 * | 9/2011 | Yamashita | H01S 3/1307 372/29.016 |
| 2014/0219298 | A1 * | 8/2014 | Fermann | H01S 3/1068 372/18 |
| 2014/0306101 | A1 * | 10/2014 | Zornoza Indart | G01D 5/35364 250/227.14 |
| 2015/0357788 | A1 * | 12/2015 | Puppe | H01S 3/067 372/18 |
| 2017/0038404 | A1 * | 2/2017 | Wright | G01S 11/12 |
| 2017/0047705 | A1 * | 2/2017 | Rausch | H01S 3/1307 |
| 2020/0076149 | A1 * | 3/2020 | Papp | G02F 1/0344 |
| 2021/0226418 | A1 * | 7/2021 | Zhao | H01S 5/1092 |
| 2021/0381964 | A1 * | 12/2021 | Puppe | H01S 3/1307 |

OTHER PUBLICATIONS

Yahyapour et al. "Extremely Fast Thickness Measurements With an ECOPS-Based TD-THz System", 2018 43rd International Conference on Infrared, Millimeter, and Terahertz Waves, IRMMW-THz 2018, Nagoya, Japan, Sep. 9-14, 2018, p. 1-2, Sep. 9, 2018.

* cited by examiner

OPTICAL SCANNING

RELATED APPLICATION

This application claims the benefit of priority of German Patent Application No. 10 2020 115 338.4 filed on Jun. 9, 2020, the contents of which are incorporated herein by reference in their entirety.

FIELD AND BACKGROUND OF THE INVENTION

Device for generating temporally spaced light pulses, comprising
- a first light source which emits a first train of light pulses,
- a second light source which emits a second train of light pulses, and
- a phase-locked loop which regulates the relative phase of the light-pulse trains to a target value. In addition, the invention relates to a method for generating temporally spaced light pulses.

Devices of this kind are used, for example, for ultra-fast time-resolved spectroscopy. Mode-locked lasers are usually used as light sources in this case. So-called pump-probe techniques are used for measuring and investigating the time progression of physical or chemical processes. Such techniques have been used in various scientific and technical fields. Worth mentioning are studies on relaxation dynamics in solid state systems, liquids and gases, time-resolved terahertz spectroscopy, and also signal analysis in optical communications technology. In synchrotron radiation sources, mode-locked lasers are used as light-pulse sources in order to control the generation of electron bundles over time and also to analyze the time-related behavior of electron, UV-light or X-ray pulses. All these applications have in common that the arrival times of the light pulses must be precisely controllable at an application site at which the interaction center of the relevant experiment is located. In most cases, the arrival times and/or the time intervals between consecutively incident light pulses must be variable within a certain interval in order to be able to scan the time progression of the physical, technical or chemical process to be investigated.

DE 20 2008 009 021 U1 discloses a device of the type stated at the outset in which a first light-pulse train is generated by means of a first light source and a second light-pulse train is generated by means of a second light source. A phase-locked loop is used to regulate the relative phase of the two light-pulse trains to a target value. In this process, the relative phase indicates the time interval between a pulse from the first light-pulse train and the subsequent light pulse from the second light-pulse train. At a phase of 0 or $2\pi$, the light pulses are emitted by the two light sources simultaneously. Each phase value therebetween is obtained by $t/T \times 2\pi$, where t indicates the time interval between a pulse from the first light-pulse train and the subsequent light pulse from the second light-pulse train and T is the time interval between two successive light pulses from one of the two light-pulse trains. This implies that the two light-pulse trains are periodic and have an (approximately) identical repetition frequency (equal to 1/T). In the known device, a control signal for the phase-locked loop is formed from the light-pulse trains of the two light sources by means of a phase detector, said loop comprising a controller which generates an actuating signal which influences the repetition rate of the light-pulse train of one of the two light sources. By changing the repetition frequency, i.e. the reference variable, the light-pulse train of one light source is caused to lead or trail behind compared with the light-pulse train of the other light source in a targeted manner by means of the controller until the target phase value, i.e. the desired time offset, is produced. The known device has the advantage that the time offset between the light-pulse trains can be predetermined in almost any manner. The scanning region, i.e. the region over which the time offset is varied, e.g. in a pump-probe experiment, can be predetermined as desired.

In the known device, the phase is controlled at the location of the device. Typically, phase detection takes place at the output of the device for this purpose. In various applications, however, there is the requirement that the two light-pulse trains are each transmitted to a spatially remote application site over an optical transmission path which may be several meters long. This gives rise to the problem of phase fluctuations in the light-pulse trains occurring along the transmission path due to external influences (e.g. temperature, mechanical vibrations, pressure). Additional stabilization of these fluctuations according to the prior art would require separate control elements and additional detectors.

For example, terahertz experiments are carried out on the basis of two phase-locked short-pulse lasers, i.e. which are coupled to one another via a phase-locked loop, as previously described, in the form of light sources, by a voltage signal being applied at the input of the phase-locking electronics, the time-variable set value of which predetermines the target value of the relative phase between the laser pulses. In this case, the terahertz system comprises a terahertz transmitter, to which the laser pulses of one short-pulse laser are applied. A detection signal is generated by the signal at the terahertz receiver being scanned by applying the laser pulses of the other short-pulse laser while varying the relative phase, i.e. the time offset of the laser pulses of the two short-pulse lasers. In order to improve the signal-to-noise ratio (SNR), the thus captured detection signals have to be repeatedly measured and averaged, the variation in the phase being cyclically run through multiple times. There is only an improvement in the SNR if, during the averaging, i.e. while the measurements are being repeated, there is no drift in the relative phase between the laser pulses and therefore the terahertz pulses. In the terahertz system, the laser pulses are supplied to the antenna modules by the transmitter and receiver typically over transmission paths in the form of optical fibers. Theses fiber deliveries are subject to external influences. For example, temperature fluctuations result in instability of the phase coupling of the two short-pulse lasers. Owing to the varying environmental conditions of the fibers, jitter of a few tens of femtoseconds (fs) during typical averaging times of a few tens of milliseconds (ms) can occur over short timescales, e.g. due to acoustics and temperature fluctuations as well as in dynamic applications in an industrial environment (e.g. during movement and acceleration on robot arms or line scanners). Over longer timescales, the fluctuations may even be up to 100 fs or more. Owing to the instability of the relative phase at the application site, the averaging of the terahertz signals is temporally "blurred". As a result, the detection bandwidth is lost and the measurement result loses resolution and contrast, e.g. during measurements of thickness.

Against this background, the object of the invention is to provide an improved device for generating temporally spaced light pulses.

In a device of the type stated at the outset, in which the two light-pulse trains each pass through an optical transmission path to a spatially remote application site, the invention achieves this object in that a detection apparatus that interacts with the phase-locked loop is provided which detects a phase difference in the light-pulse trains at the application site caused by propagation-time variations along the transmission paths.

In addition, the invention proposes a method for generating temporally spaced light pulses, comprising the method steps of:
  generating a first train of light pulses,
  generating a second train of light pulses, and
  regulating the relative phase of the light-pulse trains to a target value. In this case, the two light-pulse trains are each transmitted to a spatially remote application site over an optical transmission path. A phase difference in the light-pulse trains at the application site caused by propagation-time variations along the transmission paths is detected and is compensated for along with the regulation of the relative phase.

The invention is based on the approach of using the readily available phase-locked loop to set the relative phase of the light-pulse trains such that phase differences which e.g. are caused by external fluctuations acting on the transmission paths can be compensated for. To do this, the phase difference in the light-pulse trains at the application site is detected and is incorporated during the regulation of the relative phase. For example, the target value forming the basis for the phase regulation can be shifted by an offset. As a result, the phase difference produced at the application site changes accordingly such that it then corresponds to the target value that is actually desired. The relative phase of the light pulses is stabilized.

In a preferred configuration, the detection apparatus comprises a beam splitter or circulator in the beam path between the first light source and the application site as well as in the beam path between the second light source and the application site, the beam splitter or circulator guiding light pulses reflected by the application site towards a detector, e.g. in the form of a standard photodetector, incorporated in the phase-locked loop after passing through the transmission path in the return direction. In this configuration, the phase difference in the light-pulse trains at the application site is derived indirectly from light pulses that are reflected by the application site and pass through the transmission paths in the return direction. In practical applications, reflections of the light pulses transmitted to the application site that then pass through the transmission paths in the return direction often arise without any special measures. Where necessary, it is also readily possible to use suitable measures in a targeted manner to ensure that the light pulses are reflected back into the transmission path from the application site with a small proportion of the pulse energy. When detecting the thus reflected light pulses after passing through the transmission paths twice, the relative phase of the light pulses at the application site can be detected at the location of the device on the basis of the reflected light pulses. Because said pulses pass through said transmission paths twice, the phase difference caused by external influences and fluctuations along the transmission paths is contained in the thus measured phase value twice, i.e. with double the value. This has to be accordingly taken into account in the compensation so that the relative phase of the light pulses again corresponds to the target value after the compensation at the application site.

In a possible configuration, the reflected light pulses in the first train are guided to a first photodetector, while the reflected light pulses in the second train are guided to a second photodetector. The relative phase can then be detected directly by means of a phase detector connected to the two photodetectors and can be used for the phase regulation.

In an alternative configuration, the beam splitters or circulators superimpose the reflected light pulses of the two light-pulse trains (I, II) on a (first) coincidence detector, e.g. in the form of a two-photon detector or a balanced optical cross-correlator (BOC). This means that the outputs of the beam splitters or circulators assigned to the two light-pulse trains are brought together on a single coincidence detector. Said detector generates a signal when the light pulses of the first and second train temporally coincide over the transmission paths. By comparison with the target value of the relative phase at the point at which the coincidence occurs, the phase difference at the application site caused by fluctuations in the transmission can be derived and compensated for accordingly.

In another possible configuration, the detection apparatus comprises an additional beam splitter in each beam path between the light sources and the beam splitters or circulators, the additional beam splitters superimposing the light pulses emitted by the two light sources on an additional (second) coincidence detector in a partial beam in each case. The outputs of the two additional beam splitters are therefore brought together on the second coincidence detector. Said detector generates a signal when the light pulses of the two trains temporally coincide before passing through the transmission paths. The difference between the target value at which coincidence of the light pulses reflected over the transmission paths is detected and the target value at which coincidence of the light pulses before passing through the transmission paths is detected is equal to double (because said pulses pass through the transmission path twice) the value of the phase difference caused by propagation-time differences along the transmission paths. This can be directly taken into account in the compensation, e.g. by means of a corresponding phase offset which is added to the target value.

In another preferred configuration, the device periodically varies the target value of the relative phase of the light-pulse trains such that the first light-pulse train and the second light-pulse train have a periodically varying time offset. This configuration is suitable for scanning a time interval as part of a pump-probe experiment. In this experiment, the points in time of the coincidences can be repeatedly detected by means of the coincidence detectors and can be compared with the current target values at these points in time, in order to thus detect fluctuations in the phase difference and to accordingly update the phase offset for the compensation.

In a possible practical use of the device according to the invention, a terahertz transmitter and a terahertz receiver are located at the application site, the first light-pulse train being supplied to the terahertz transmitter via the transmission path assigned to said train and the second light-pulse train being supplied to the terahertz receiver via the transmission path assigned to said train. The device according to the invention makes it possible to avoid the above-described drawbacks. The jitter of the light-pulse trains that conventionally occurs due to the varying environmental conditions is compensated for. When averaging the detection signals, negative effects of the jitter on resolution and contrast are minimized.

FIELD AND BACKGROUND OF THE INVENTION

Embodiments of the invention will be explained in greater detail in the following with reference to the drawings, in which.

DESCRIPTION OF SPECIFIC EMBODIMENTS OF THE INVENTION

Figure 1:
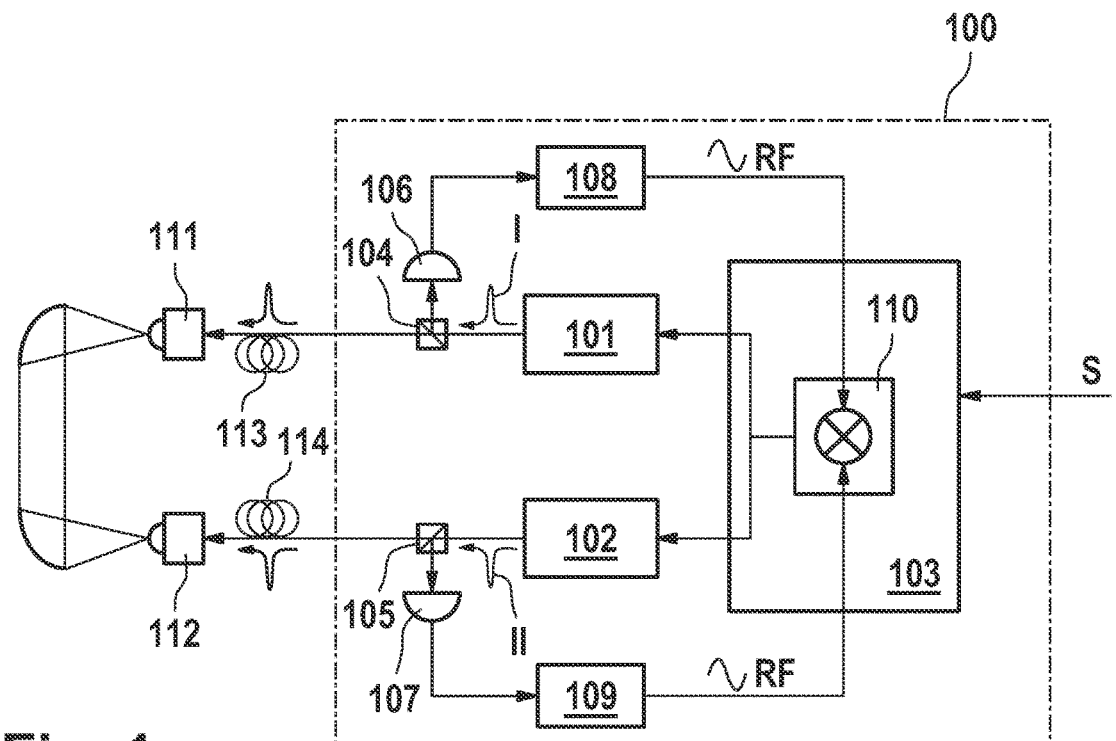
FIG. 1 is a block diagram of a device for generating temporally spaced light pulses according to the prior art.

FIG. 1 shows a device for generating temporally spaced light pulses according to the prior art. The components of the device are arranged in a housing 100. A first light source 101 and a second light source 102 are provided in the form of mode-locked fiber lasers. The first light source 101 generates a first train I of light pulses, while the second light source generates a second train II of light pulses. The light pulses are accordingly short laser pulses (pulse duration in the range of 10 fs to 10 ps), which are each emitted at a repetition frequency in the MHz range. A controller 103 applies a regulating signal, which influences the repetition frequency of the light-pulse train I, II, to each of the light sources 101, 102. The light-pulse trains I, II are each guided to a photodetector 106, 107 via beam splitters 104, 105. The outputs of the photodetectors 106, 107 are each connected to band-pass filters 108, 109. The output signals of the band-pass filters 108, 109 are high-frequency signals, which are brought together on a phase detector 110 of the controller. In this way, a control signal is formed within a phase-locked loop from the light-pulse trains I, II from the two light sources 101, 102 by means of the phase detector 110. By changing the repetition frequencies of the lasers 101, 102, the light-pulse train I of one light source 101 is caused to lead or trail behind compared with the light-pulse train II of the other light source 102 in a targeted manner by means of the controller 103 until a target phase value S, i.e. a desired time offset between the light-pulse trains I, II, predetermined from outside the device, is produced. In the example shown, a terahertz transmitter 111 is provided to which the laser pulses I from the short-pulse laser 101 are applied. A detection signal is generated by the signal at a terahertz receiver 112 being scanned by applying the laser pulses II of the other short-pulse laser 102 while varying the relative phase. The laser-pulse trains I, II are supplied to the antenna modules by the transmitter and receiver 111, 112 over transmission paths 113, 114 in the form of optical fibers. This supply to the fibers is subject to external influences. Owing to the varying environmental conditions (temperature, pressure, acoustic vibrations, etc.) of the fibers, jitter, i.e. fluctuating deviations in the relative phase of the pulse trains I, II from the target value of a few tens of femtoseconds (fs) to several hundreds of femtoseconds (fs), is generated at the location of the transmitter 111 and receiver 112. This instability of the relative phase negatively affects bandwidth, contrast and resolution of the measurement.

Figure 2:
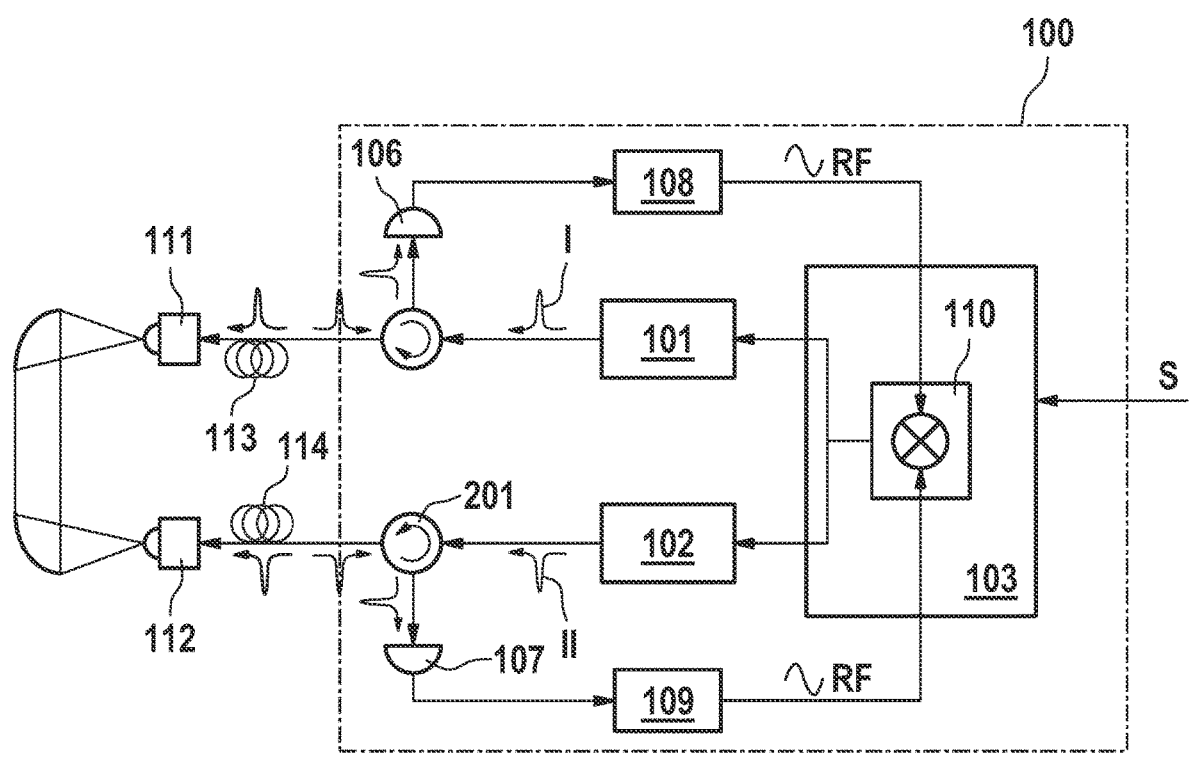
FIG. 2 is a block diagram of the device according to the invention in a first configuration.
Figure 3:
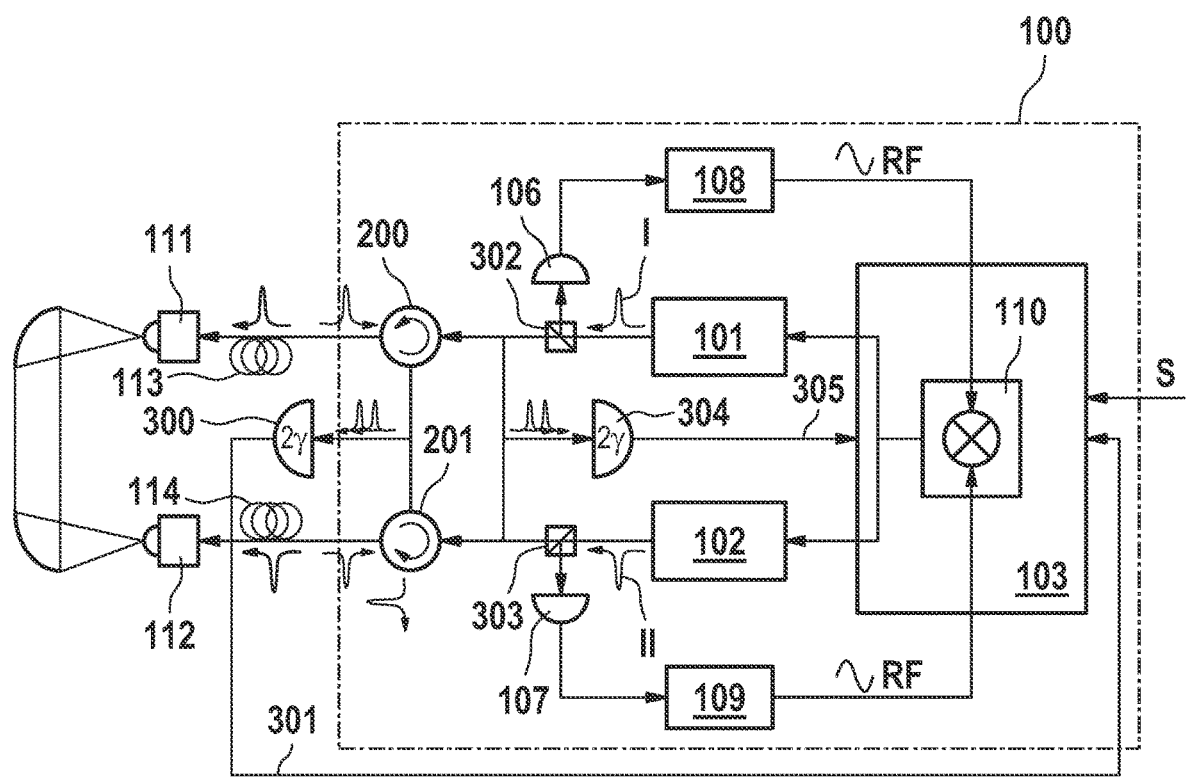
FIG. 3 is a block diagram of the device according to the invention in a second configuration.
Figure 4:
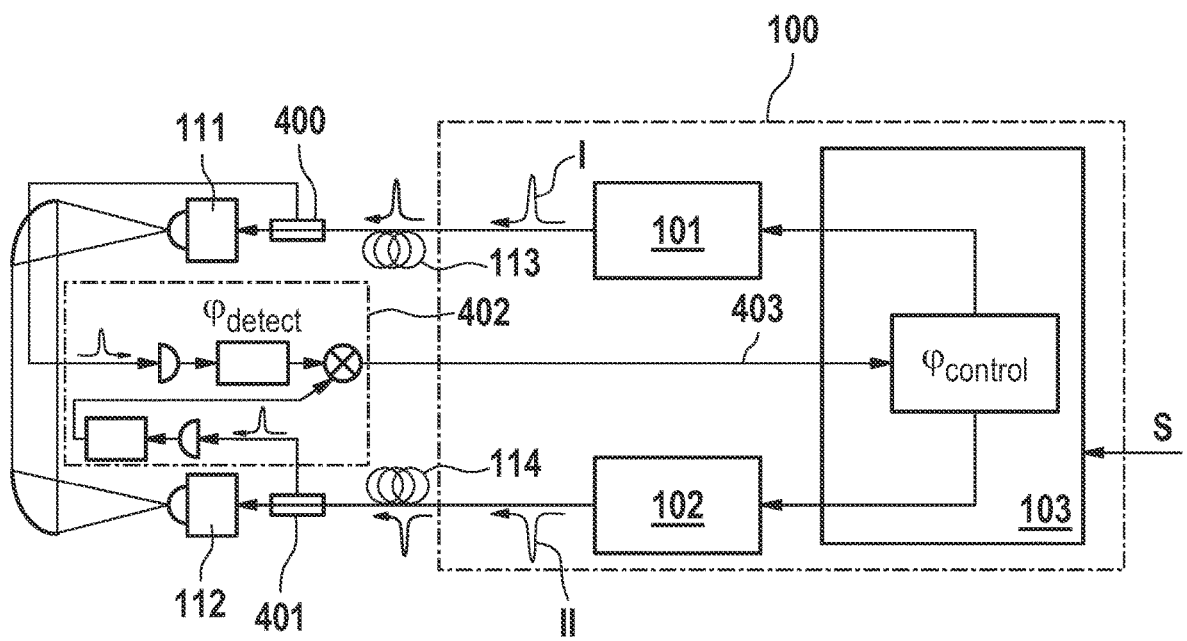
FIG. 4 is a block diagram of the device according to the invention in a third configuration.

According to the invention, this is remedied by the phase difference in the light-pulse trains I, II at the application site, i.e. at the location of the transmitter 111 and the receiver 112, caused by the propagation-time differences along the transmission paths 113, 114 being detected, with this undesired phase difference being compensated for during the regulation of the relative phase. FIGS. 2 to 4 illustrate this.

In the embodiment in FIG. 2, a detection apparatus is provided which comprises a circulator 200, 201 in the beam path between the first light source 101 and the input of the transmission path 113 as well as in the beam path between the second light source 102 and the input of the transmission path 114. The circulators 200, 201 guide light pulses reflected by the antenna modules of the transmitter 111 and/or receiver 112 towards the photodetectors 106, 107 after passing through the relevant transmission path 113, 114 in the return direction. In this configuration, the phase difference in the light-pulse trains I, II at the location of the transmitter 111 and/or receiver 112 is indirectly derived from the reflected light pulses I, II that pass through the transmission paths 113, 114 in the return direction. By using the relative phase measured indirectly in this way which the light pulses I, II have at the application site, undesired fluctuations can be directly compensated for during the phase regulation, and specifically without additional regulation and control elements.

A configuration in which the phase-locked loop is left as shown in FIG. 1, i.e. with detection of the relative phase of the light-pulse trains I, II before they enter the transmission paths 113, 114, is also conceivable. In this process, the relative phase of the reflected light pulses is detected separately by additional photodetectors (not shown). On this basis, the phase regulation can then be compensated for, e.g. by accordingly adding an offset to the target value S. This configuration may be useful if (rather slow) fluctuations due to external influences on the transmission paths 113, 114 are intended to be compensated for using a bandwidth that is different from the phase regulation of the light-pulse trains I, II.

In the embodiment in FIG. 3, the circulators 200, 201 superimpose the reflected light pulses of the two light-pulse trains I, II on a first two-photon detector 300. Said detector generates a signal when the light pulses of the first and second train I, II temporally coincide over the transmission paths. The coincidence signal 301 is supplied to the controller 103. In addition, the detection apparatus comprises a beam splitter 302, 303 in each beam path between the light sources 101, 102 and the circulators 200, 201. Said beam splitters superimpose the light-pulse trains I, II emitted by the two light sources 101, 102 on a second two-photon detector 304 in a partial beam in each case. Said detector generates a signal when the light pulses of the two trains I, II temporally coincide before passing through the transmission paths 113, 114. The resulting second coincidence signal 305 is likewise supplied to the controller 103. Said controller compensates for the phase difference caused by external influences during the transmission of the light-pulse trains I, II over the transmission paths 113, 114 by comparison with the respective target values when the coincidences occur. In a pump-probe experiment in which the target value of the relative phase of the light-pulse trains I, II is continuously modulated, the coincidences can be used as time stamps in this way. Therefore, the time axis can be calibrated as the pump-probe experiment progresses, such that a current value of the relative phase of the light pulses of the two trains I, II at the application site can be assigned to each point in time.

It is also conceivable to compensate for the phase fluctuations in the light pulses along the fiber paths 113, 114 to the THz transmitter 111 or THz receiver 112 independently of one another, i.e. for each fiber path 113, 114 separately. To do this, for each fiber path 113, 114, each reflected, returning light pulse can be used with an outgoing light pulse in order to generate a coincidence signal (not shown).

In the embodiment in FIG. 4, the detection apparatus comprises beam splitters 400, 401 arranged at the location of the terahertz transmitter 111 and terahertz receiver 113, i.e.

at the ends of the fiber paths 113, 114, which beam splitters guide the first and the second light-pulse train I, II to a phase detector 402 in a partial beam in each case. The phase-difference signal detected directly at the application site is supplied directly to the controller 103 as a controlled variable.

What is claimed is:

1. A device for generating temporally spaced light pulses, comprising
    a first light source arranged to emit a first train of light pulses,
    a second light source arranged to emit a second train of light pulses, and
    a phase-locked loop arranged to regulate the relative phase of the light-pulse trains towards a target value,
    wherein each of the two light-pulse trains pass through an optical fiber transmission path of at least one meter length to an application site that is spatially remote from the light sources at the end of the optical fiber transmission paths, wherein a detection apparatus comprising at least one sensor and arranged to interact with the phase-locked loop is provided which detects a phase difference in the light-pulse trains at the application site caused by propagation-time differences along the optical fiber transmission paths, wherein the phase-locked loop is configured to incorporate the phase difference detected at the application site in the regulation of the relative phase of the light pulse trains emitted by the first and second light sources, wherein the phase-locked loop is configured to incorporate the phase difference detected at the application site in the regulation of the relative phase of the light pulse trains emitted by the first and second light sources, such that a phase difference caused by external fluctuations acting on the optical fiber transmission paths is compensated for.

2. The device according to claim 1, wherein the detection apparatus is further arranged to detect a phase difference of the light pulses reflected at the application site after passing through the transmission path in the return direction.

3. The device according to claim 2, wherein the detection apparatus comprises a beam splitter or a circulator in the beam path between the first light source and the application site as well as in the beam path between the second light source and the application site, wherein the beam splitter or the circulator in the beam path guides light pulses reflected by the application site in the return direction towards a detector.

4. The device according to claim 3, wherein the detector is a photodetector.

5. The device according to claim 3, wherein the beam splitter or the circulator superimpose the reflected light pulses of the two light-pulse trains on a first coincidence detector.

6. The device according to claim 5, wherein the detection apparatus comprises an additional beam splitter in each beam path, wherein the additional beam splitter superimposes the light pulses emitted by the two light sources on a second coincidence detector in a partial beam in each case.

7. The device according to claim 1, wherein one detector is assigned to each transmission path.

8. The device according to claim 1, wherein the detection apparatus comprises beam splitters arranged at the application site which guide the first and the second light-pulse trains to a phase detector, which is arranged to detect the phase difference of the light-pulse trains, in a partial beam after passing through the transmission paths.

9. The device according to claim 1, wherein the device is arranged to periodically vary the target value of the relative phase of the light-pulse trains such that the first light-pulse train and the second light-pulse train have a periodically varying time offset.

10. The device according to claim 1, wherein a terahertz transmitter and a terahertz receiver are located at the application site, wherein the first light-pulse train is supplied to the terahertz transmitter via the transmission path assigned to said train and the second light-pulse train is supplied to the terahertz receiver via the transmission path assigned to said train.

11. A method for generating temporally spaced light pulses, comprising:
    generating a first train of light pulses,
    generating a second train of light pulses, and
    regulating the relative phase of the light-pulse trains towards a target value,
    wherein each of the two light-pulse trains pass through an optical fiber transmission path of at least one meter length to an application site that is spatially remote from the light sources at the end of fiber transmission the optical paths,
        compensating for a phase difference caused by external fluctuations acting on the optical fiber transmission paths based on a detection of a phase difference in the light-pulse trains at the application site caused by propagation-time differences along the optical fiber transmission paths, wherein the phase difference detected at the application site is incorporated in the regulation of the relative phase of the generated first and second light pulse trains.

12. The method according to claim 11, wherein the phase difference of the light-pulse trains at the application site is derived from light pulses that are reflected from the application site and pass through the transmission paths in the return direction.

13. The method according to claim 12, wherein the light pulses are superimposed on a coincidence detector after passing through the transmission paths in the return direction.

14. The method according to claim 11, wherein the target value of the relative phase of the light-pulse trains is periodically varied such that the first light-pulse train and the second light-pulse train have a periodically varying time offset.

* * * * *